Aug. 5, 1969  R. A. PLANTE  3,458,939
DIAMETER GAUGE

Filed Aug. 17, 1966  4 Sheets-Sheet 1

Inventor
Robert A. Plante
by Kenway, Jenney & Hildreth

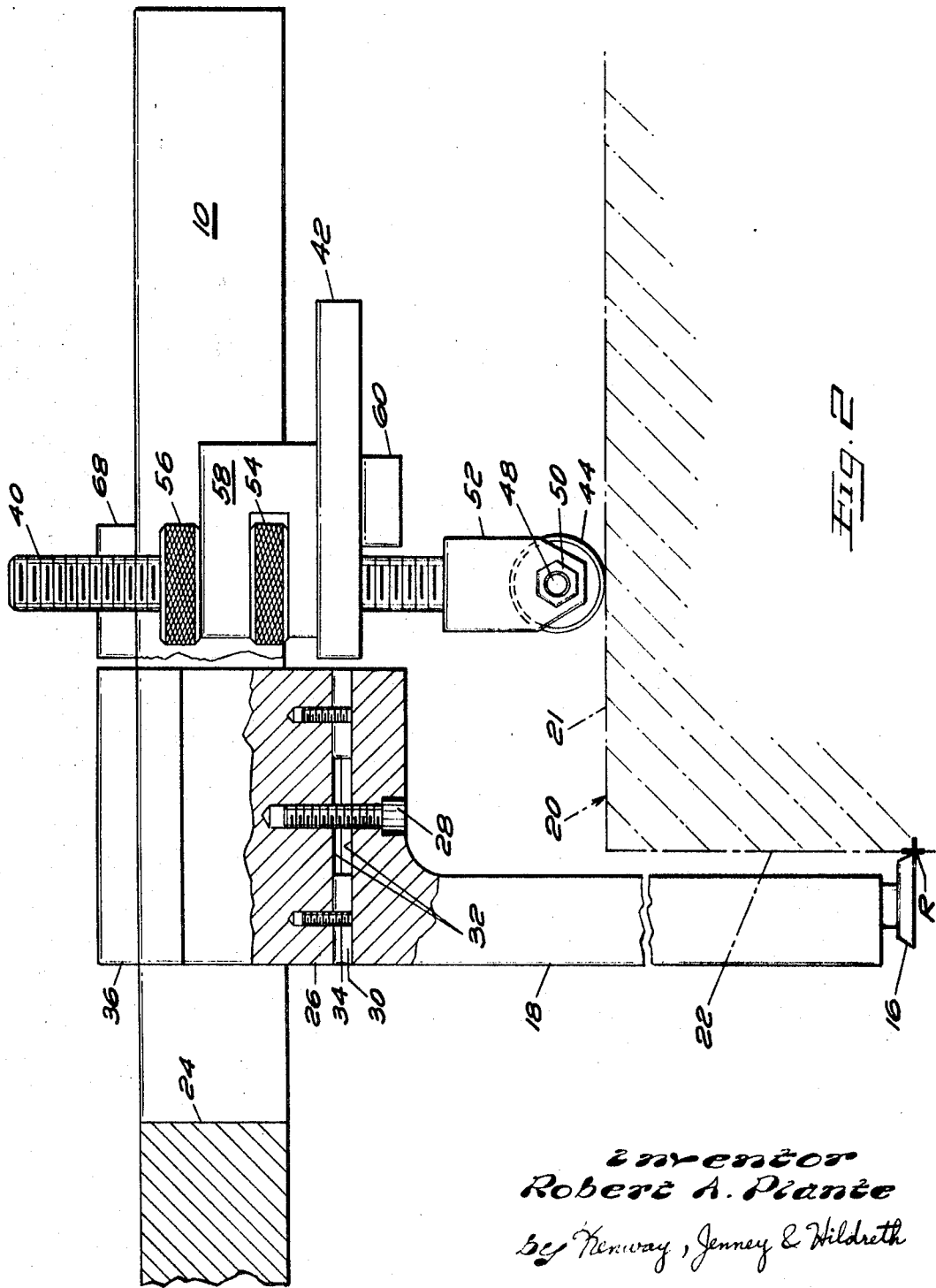

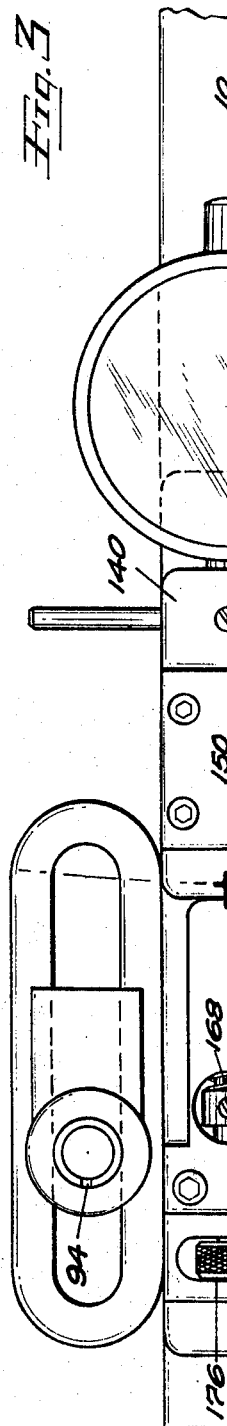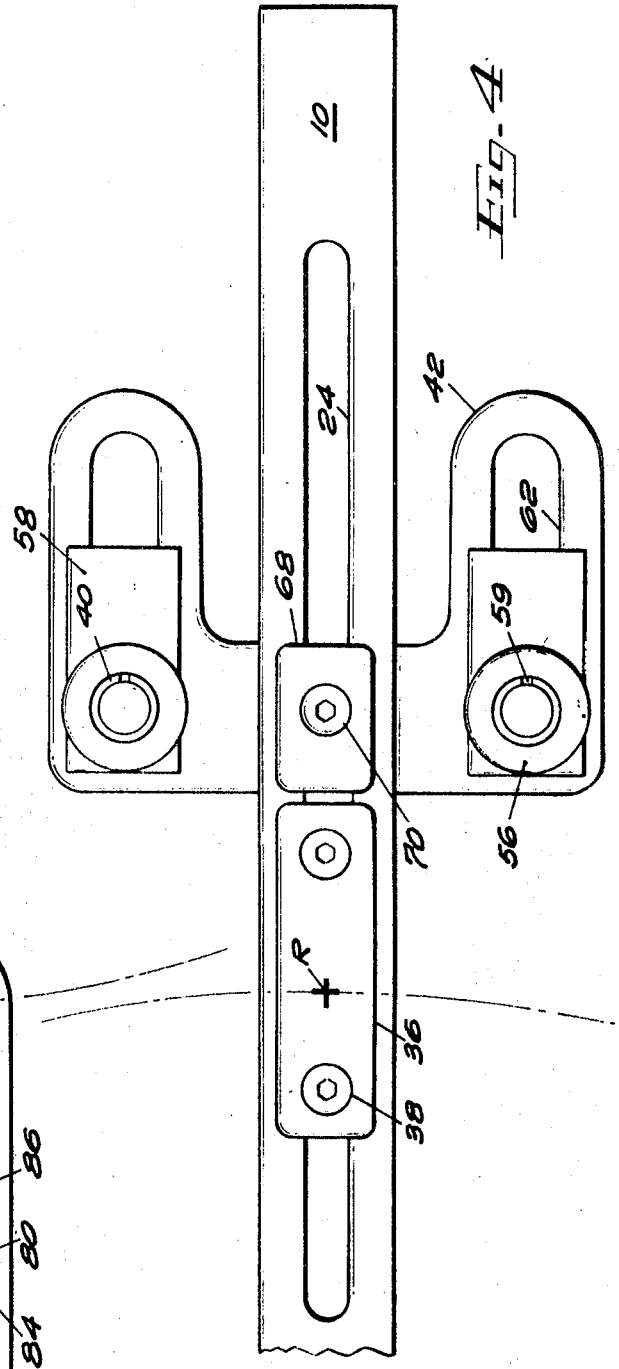

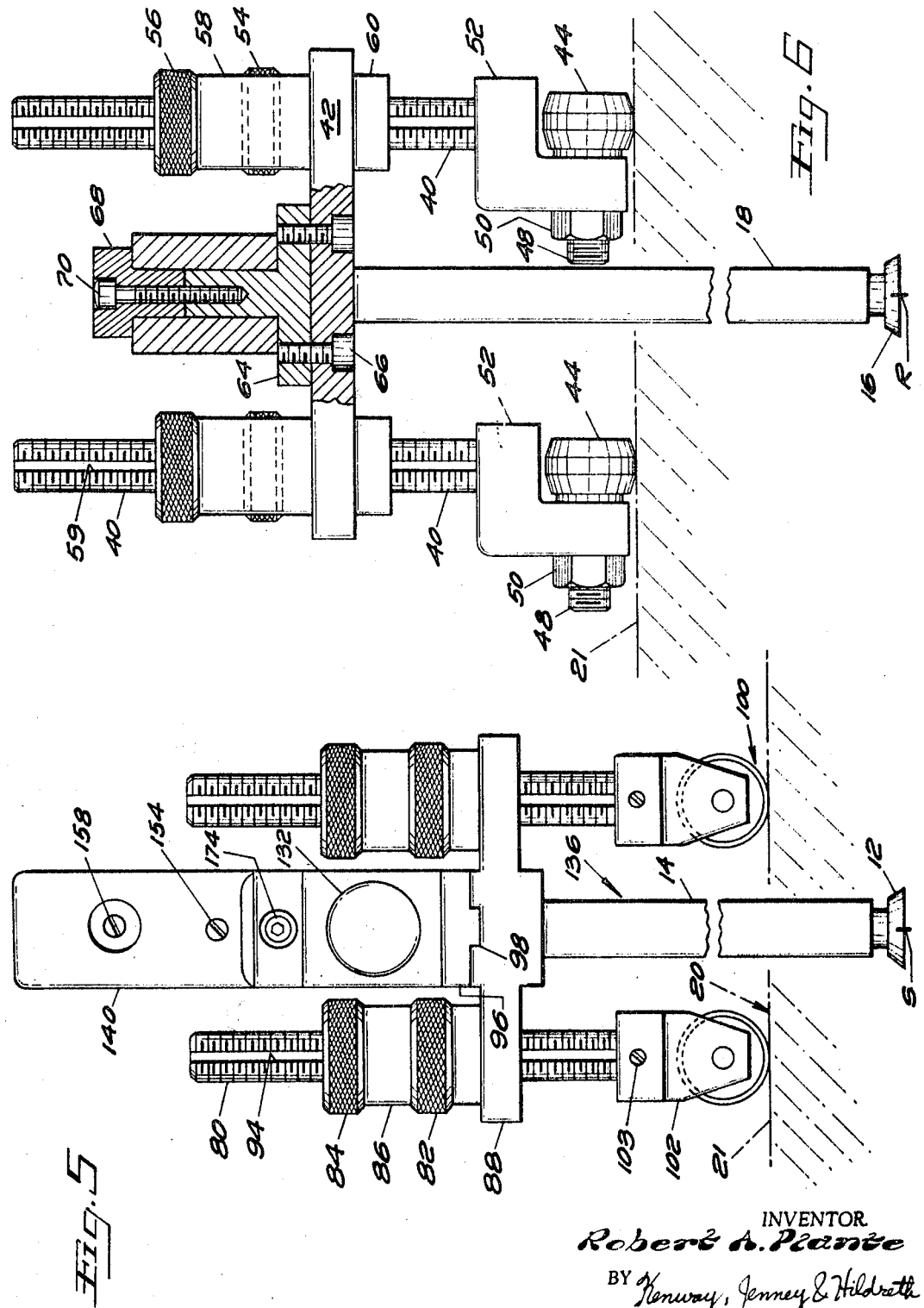

United States Patent Office 3,458,939
Patented Aug. 5, 1969

3,458,939
DIAMETER GAUGE
Robert A. Plante, Erving, Mass., assignor to the L. S. Starrett Company, Athol, Mass., a corporation of Massachusetts
Filed Aug. 17, 1966, Ser. No. 572,972
Int. Cl. G01b 5/12
U.S. Cl. 33—147                                              7 Claims

ABSTRACT OF THE DISCLOSURE

A gauge for measuring a dimension of a workpiece at a given distance from a reference surface has an elongated beam that is supported by rest legs which in turn are abuttingly engageable with the reference surface of the workpiece to position the beam in predetermined relation to the reference surface. A pair of probes are supported by drop legs which in turn are mounted to and are spaced along the length of the beam. The drop legs extend along the workpiece to position the probes at the desired distance from the reference surface. One of the drop legs is movable along the beam to enable its associated probe to be moved toward and away from the other drop leg and its associated probe so that the probes may measure the desired workpiece dimension. The workpiece engaging portion of each rest leg is provided with a bearing to reduce friction between the rest legs and the reference surface.

---

This invention relates to an improved gauge of the type which is provided with a reference probe mounted on a beam, and a sensitive probe which is movably mounted on the beam and operatively associated with a dial indicator or the like. The gauge is used to determine the deviation of a work-piece dimension from a nominal value, to which the probes are present to a suitable reference standard. The invention is particularly concerned with a diameter gauge having rest legs, for positioning the beam in predetermined relation to a reference surface transverse to the surfaces whose spacing is to be determined. This type of gauge is commonly used for measuring a diameter at a given depth from the end of a cylindrical work piece; the beam is supported by the rest legs on the end surface, and the probes are mounted on drop legs which extend to the desired depth.

It is the primary object of this invention to provide an improved diameter comparison gauge which is suitable for the accurate measurement of dimensions of the order of more than one foot, at substantial depths of the order of more than an inch from a reference surface.

Previously, a diameter gauges of this type have not been usable for such large dimensions because of their poor repeatability. For example, an attempt was made to measure a large bearing race having an inside diameter of 96 inches, using a diameter gauge with rest legs. A series of measurements between the same points varied by as much as a hundredth of an inch.

A standard repeatability test consists of the averaging of 3 series of 5 measurements, each series being taken by a different experienced gauge operator. Gauges are conventionally considered capable of measuring only to a tolerance 10 times greater than their range of repeatability; for example, to measure accurately to a tolerance of .001 inch, the gauge should measure the same part in a standard test with an average variation not greater than .0001 inch.

Because of the lack of repeatability of measurements of long dimensions by previous diameter gauges, it has been necessary to have recourse to fixed type standards such as gauge blocks. However, this affords only a "go-no go" comparison, which either accepts or rejects a work-piece dimension, and does not determine the actual difference between the work-piece and the nominal dimension. This method is slow and requires highly skilled operators.

According to the present invention, in a preferred embodiment, I provide a diameter gauge including a beam; a fixed reference probe and a movable sensitive probe carried on drop legs; and rest legs of which at least one, which is nearest to the sensitive probe, terminates in roller means which allow free movement of the rest leg in any direction parallel to the reference surface. In a preferred form, the roller means rotate about an axis parallel to the reference surface, and slide linearly along that axis; although they may rotate about mutually-perpendicular axes. The roller means may comprise a linear ball bushing which is slidable along an axle extending parallel to the length of the beam, and a roller or needle bearing mounting a wheel on the ball bushing for rotation about the axle. Also, I prefer to terminate the rest leg or legs which are nearest the reference end of the beam in further roller means, which are free to rotate about one axis parallel to the reference surface; although they need not, in this case, be free to slide along this axis or to rotate about a perpendicular axis.

I have discovered that these provisions give a surprising improvement, in that it is feasible to secure an average repeatability on the order of .0001 inch or less, when making measurements substantially greater than one foot, and with a drop length of several inches and more. The reasons for this substantial improvement are not entirely clear, but may be due in large measure to the reduction in mechanical hysteresis of the gauge as it is oscillated about the reference probe in making a measurement.

In use, the operator rests the drop legs on the reference surfaces; he need not apply endwise pressure to the beam to insure contact of the reference probe with one of the surfaces whose spacing is to be measured, as was the practice with previous gauges of this type. Application of endwise pressure to a conventional gauge detracted from repeatability, and tended to scratch the work. But a preload spring acting on the sensitive probe is sufficient to insure contact when using my improved gauge.

The operator then oscillates the sensitive end of the beam over the other measured surface, to locate the correct point of measurement; e.g. when gauging a diameter, he maximum reading occurs when the sensitive probe reaches a point diametrically opposed to the reference probe. The very slight frictional resistance between a conventional rest leg and the reference surface of the work-piece, as the gauge is oscillated, apparently causes sufficient mechanical hysteresis to prevent satisfactory repetition of the measurement.

I have found that it is not sufficient to mount a rest leg which is near the sensitive probe on a roller which is rotatable about a single axis, but is neither slidable along this axis nor rotatable about a perpendicular axis; the movement at the snsitive end of the gauge must be free in any direction parallel to the reference surface. But one degree of rotational freedom appears adequate at the reference end of the gauge, perhaps because of the smaller arcuate movement.

While the application concludes with claims particularly pointing out the subject matter which I regard as my invention, it is believed that a clearer understanding may be gained from the following detailed description of a a preferred embodiment, referring to the accompanying drawings, in which:

FIGURE 2 is a similar view of the reference end of the gauge;

FIGURE 3 is a fragmentary plan view of the sensitive end;

FIGURE 4 is a similar view of the reference end;

FIGURE 5 is a view in end elevation of the sensitive end of the gauge; and

FIGURE 6 is a similar view of the reference end.

Figure 1:
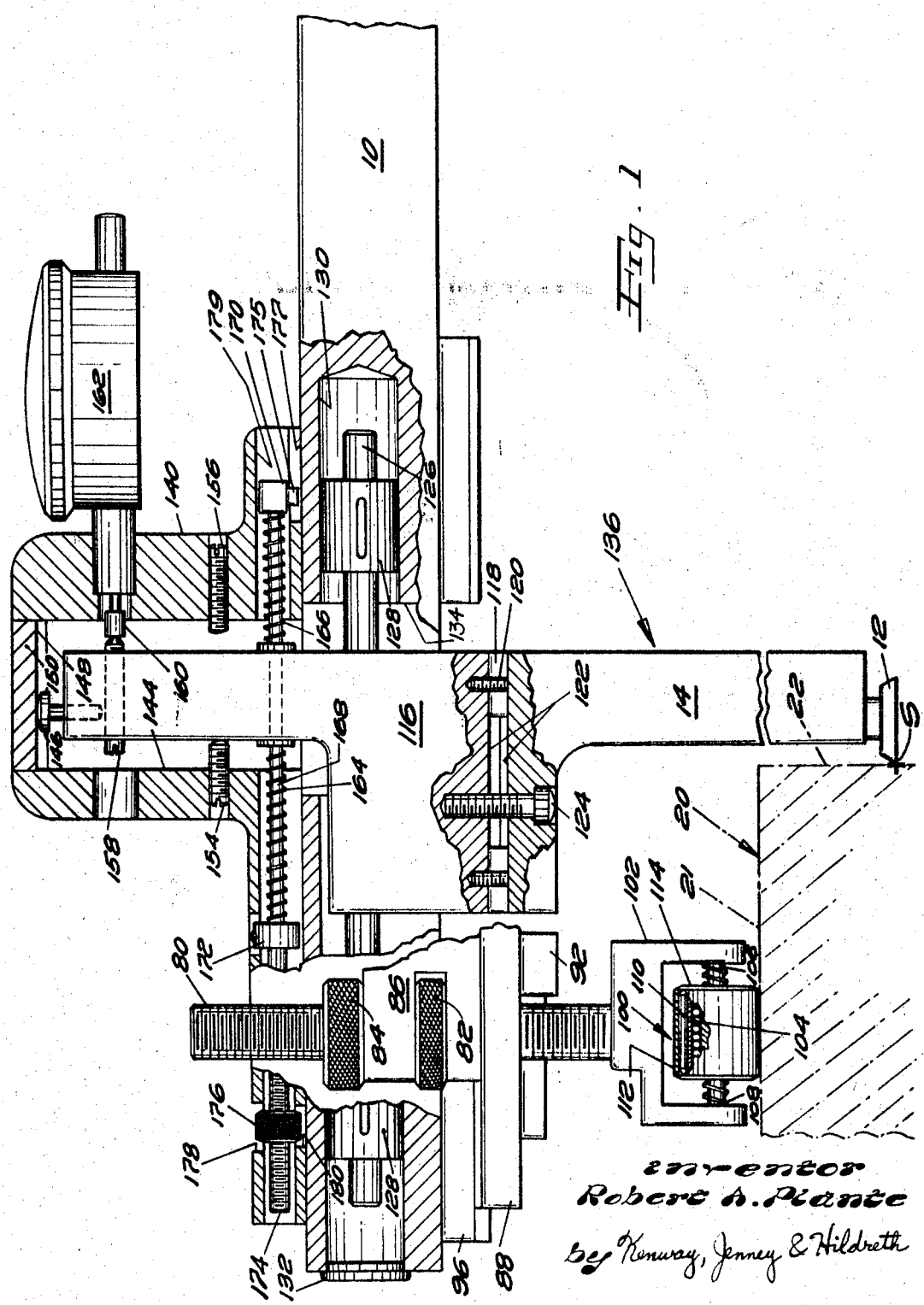
FIGURE 1 is a fragmentary view in side elevation, and partially in section, of the sensitive end of a preferred form of the improved gauge.

The gauge generally comprises a beam 10 of a length suitable for the range of measurements to be made, a sensitive probe 12 carried by an interchangeable drop leg 14, and a reference probe 16 carried by a similar interchangeable drop leg 18. The gauge is shown in operative relationship to a typical work-piece 20 for measuring the diameter of a large internal bore 22. This measurement is to be taken at a given depth below a plane reference surface 21.

Referring to FIGURES 2, 4, and 6, the drop leg 18 of the reference probe 16 is normally set in a fixed adjusted position on the beam, which is provided with an elongated slot 24 so that this probe may be moved to adapt the gauge to measure a range of dimensions without changing the beam. The drop leg 18 is mounted on a T-block 26 by a machine screw 28, and is accurately aligned by a pair of gibs 30; the gibs are received in mating slots 32 in the drop leg 18 and the T-block 26, and secured by set screws 34. Drop legs of different lengths can thus be interchanged conveniently with automatic alignment of the probe with respect to the beam. The T-block 26 is secured in an adjusted position along the slot 24 by means of a T-bar 36 and machine screws 38 threaded into the T-block.

To support the probe 16 at a predetermined depth within the work-piece 20, a pair of rest legs, comprising drop adjustment screws 40, are mounted on a slide member 42 carried by the beam 10 for adjustable lengthwise movement within the slot 24 independently of the position of the T block 26 and its associated drop leg 18. The legs are provided with rollers 44, in accordance with a feature of the invention. The rollers 44 are rotatable about a single axis defined by their axles 48, as single-axis rotation is found to be adequate at the reference end of the gauge. In use, the gauge is oscillated about a point R at which the reference probe 16 contacts the surface 22, so that the oscillatory movements of the rollers 44 are small. The axle 48 of each roller is threaded to receive a nut 50 by which it is secured in an L-shaped, mounting head 52. Each head 52 is threadedly engaged on the lower end of one of the drop adjustment screws 40, and held securely by a set-screw (not shown).

The heightwise position of the beam 10 on the rest legs, and consequently the drop or depth of the probe 16, is adjustable by means of knurled adjustment nuts 54 and lock nuts 56 threaded on the screws 40. The adjustment nuts 54 are captured in L-shaped drop adjustment blocks 58, through which the screws 40 pass freely. A groove 59 is formed along each screw 40, and cooperates with a key (not shown) in each block 58 to prevent the screws 40 from turning. The blocks 58 rest upon the upper surface of the slide 42, and are secured in longitudinally-adjusted positions by means of T-shaped blocks 60, and screws (not shown) passing upwardly through these blocks and threaded into the drop adjustment blocks. The drop adjustment screws 40 and the blocks 60 are received in longitudinally-slidable relation in elongated slots 62 formed in the slide 42, to adapt the gauge to parts of various configurations and dimensions. An additional length adjustment is provided by mounting the slide 42 adjustably in the slot 24 of the beam 10, by means of a T-block 64 to which the slide is attached by machine screws 66 (FIGURE 6). The block 64 is secured in longitudinally-adjusted position by means of a T-bar 68 and an elongated machine screw 70.

Referring now particularly to FIGURES 1, 3 and 5, the sensitive end of the gauge is provided with a pair of similar rest legs comprising drop adjustment screws 80. These legs are adjustable to vary the drop of the probe 12 by means of knurled adjustment nuts 82 and lock nuts 84, and drop adjustment blocks 86. The blocks 86 cooperate with a slide member 88 having elongated slots 90 for longitudinal adjustment, and T-blocks 92 which pass upwardly into the slots 90 and are secured to the drop adjustment blocks 86 by suitable screws (not shown). A groove 94 is formed along each drop adjustment screw 80, and is engaged by a suitable key (not shown) in the corresponding block 86 to restrain the screws against rotation. The slide 88 is mounted on the beam 10 by means of a pad 96 having a longitudinal protrusion 98 to ensure correct alignment. The assembly is secured by suitable screws (not shown), and may provide several mounting positions to increase the range of the gauge and to adapt it to various work-piece configurations.

According to the invention, the rest legs comprising drop adjustment screws 80 terminate in roller means 100, which provide freedom of motion in any direction parallel to the plane reference surface 21 of the work-piece. Each roller 100 is mounted in a yoke 102, which is threadedly attached to the bottom of a screw 80, and held in proper angular relation by a set screw 103 (FIG. 5). In the preferred embodiment shown, each roller includes a commercially-available linear ball bushing 104, which is longitudinally slidable on an elongated axle 106 mounted in the yoke. When the gauge is raised from the work-piece, the roller is automatically centered on the axle by means of a pair of compression springs 108 interposed between the roller and the arms of the yoke. Thus, the roller is free to move relative to the gauge along the axle 106 as the gauge is oscillated about the reference point R. Needle bearings 110 are positioned about the outer casing of the ball bushing 104, and mount a roller wheel 112 for free rotation about the axis of the axle 106. The assembly is completed by closure caps 114.

There are relatively large oscillatory movements of the sensitive probe 12, as the gauge is shifted to locate the correct measuring point S diametrically opposed to the reference point R. This appears to require freedom of the rest legs near the sensitive end to move in perpendicular directions parallel to the reference surface 21. The mechanical hysteresis induced by the lateral frictional resistance of a roller which has only one degree of freedom would occasion unacceptably large variations in repeated readings.

Thus each roller 100 may both rotate about and slide axially along the axle 106 to enable the rest legs and consequently the beam 10 and sensitive probe 12 to have limited omnidirectional movement only within a plane paralleling that of the reference surface 21.

The drop leg 14 is carried on a mounting block 116 and is detachable for convenient replacement by drop legs of various lengths. The drop leg and mounting block are aligned by means of a pair of gibs 118 which are secured by set screws 120 in mating grooves 122. The assembly is secured by a machine screw 124. The block 116 is fixed on a slide shaft 126, which is slidably received in a pair of conventional linear ball bushings 128. The ball bushings are received within an elongated bore 130 extending longitudinally from an end of the beam and closed by a cap 132. A transverse slot 134 allows freedom of longitudinal movement. A movable sensitive probe assembly 136 is thus comprised of the probe 12, drop leg 14, block 116, and shaft 126. I prefer to use a ball bushing mounting for this sensitive probe assembly, although it should be understood that the invention is applicable to other types of sensitive probe mounting, such as a spring pantograph. This type of mounting is illustrated, for example, by my prior U.S. Patent No. 3,104,470.

The sensitive probe assembly extends upwardly into a housing 140, which is secured on the beam 10 by screws 142, and provides a chamber 144 in which the probe assembly is movable. Transverse tilting of the probe assembly about the axis of the shaft 126 is prevented by means of a roller 146 rotatably supported on the top of the block 116; the roller is received within a groove 148 provided in a cover plate 150, which is secured to the housing by screws 152. The motion of the probe assembly is limited by set screws 154 and 156 threaded through the housing. A further set screw 158 is threaded through the block 116 to engage the actuating stem of a conventional dial indicator 162, mounted on the housing. Displacement of the probe assembly from a predetermined zero position, corresponding to the nominal dimension, is directly readable on the dial indicator. The gauge therefore compares the work-piece dimension R–S with the nominal value, and measures the deviation.

The sensitive probe assembly is biased longitudinally of the beam in either direction, according to whether inside or outside dimensions are to be taken, by means of a pair of compression springs 166 and 164 received in a bore 179. These springs receive an adjustment shaft 168, and bear against a slide collar 170 and a plain collar 172, which are affixed to the shaft. This shaft terminates in a threaded portion 174, on which a knurled adjustment nut 176 is received. The nut 176 is manually adjustable through a notch 178 in the housing. As the adjustment nut is turned, the shaft 168 is moved longitudinally to left or right as viewed in FIGURE 1, moving the collars 170 and 172 to vary the compression of the springs 164 and 166 oppositely. The collar 170 carries a guide pin 175, which is longitudinally slidable in a slot 177 formed in the wall of the bore 179, to prevent the shaft 168 from turning with the nut 176.

In the adjusted position illustrated in FIGURE 1, the net bias of the springs 166 and 164 acts to the left, and the gauge is set up to measure an inside dimension. If it is desired to measure an outside dimension, the spring bias is reversed; also, the drop legs 14 and 18 are reversed in position to present the probes 16 and 12 in confronting relation. When the gauge is used in a vertical or inclined position, the springs 164 and 166 are adjusted to compensate for the weight of the probe assembly 136.

In use, the gauge is first adjusted to a suitable reference master (not shown), which is accurately set to the nominal dimension of the work-piece, e.g., the nominal diameter R–S. The sensitive probe assembly 136 should then be roughly in the mid-range of its limits of movement, as limited by the screws 154 and 156. The dial indicator is set to indicate a zero reading. The gauge is then removed from the gauge block and positioned on the work-piece, with the rollers 44 and 100 supporting the gauge on the reference surfaces 21. The sensitive probe assembly is manually retracted as the probes are inserted into the bore 22. The sensitive probe is then released and the operator grips the beam lightly at the sensitive end with the reference probe 16 in contact at the point R. It is not necessary, as it was with previously-known gauges of this type, to apply pressure endwise of the beam; the preload of springs 164 and 166 is sufficient to insure contact. The gauge is oscillated slightly about point R to find the maximum reading of the dial indicator which, in the measurement of an internal diameter, locates the point S in precise diametrical opposition to the point R. The deviation of the dial indicator reading from the zero setting indicates the variation of the work-piece from the nominal dimension. The use of the gauge for the measurement of external diameters, and for the measurement of non-circular work-piece dimensions, will be readily apparent to those skilled in the art.

The improved gauge has demonstrated a repeatability within .0001 inch for measurements of a few feet, which qualifies it for the accurate measurement of tolerances to .001 inch. To achieve this result, it appears to be necessary to provide for free movement of the sensitive end of the gauge along mutually-perpendicular axes parallel to the reference surface; but freedom along only one axis is required at the reference end. It may prove feasible to utilize a spherical roller for the rest leg at the sensitive end, although available structures of this kind have so far been found inadequate. The illustrated combination of a linear ball bushing providing sliding movement along one axis, and anti-friction roller bearings providing freedom of rotation about that axis, affords highly satisfactory and proven results.

While I have illustrated and described a preferred embodiment of my improved diameter gauge, it will be apparent to those skilled in the art that various changes and modifications may be made therein without departing from the true spirit and scope of the invention.

What I claim is:

1. A gauge for measuring a dimension of a workpiece at a predetermined drop distance from reference surfaces of said workpiece, comprising a beam having a longitudinal dimension, a first drop leg affixed to said beam, a reference probe carried by said first drop leg in spaced relation to said beam, a second drop leg mounted for movement longitudinally of said beam, a sensitive probe carried by said second drop leg in spaced relation to said beam, at least two rest legs mounted in longitudinally-spaced relation on said beam for abuttingly engaging said reference surfaces of the workpiece so that upon said engagement of said rest legs with said reference surfaces said probes may be disposed at predetermined drop distances from said reference surfaces, at least one of said rest legs located nearest said sensitive probe including roller means for abuttingly engaging a reference surface, said roller means comprising a wheel, an axle supported on said one rest leg, a ball bushing received on said axle in axially-slidable relation, and an antifriction bearing supporting said wheel on said ball bushing for rotation about said axle to impart low-friction mobility to said one rest leg along perpendicular axes mutually parallel to the engaged reference surface to thereby enable that end of said gauge that is associated with said rest leg to have limited omnidirectional movement in a plane parallel to said engaged reference surface.

2. A gauge as recited in claim 1, in which said axle extends substantially parallel to the longitudinal dimension of said beam.

3. A gauge as recited in claim 1, said roller means further including yoke means supporting said axle on said one rest leg, and spring means biasing said ball bushing and wheel along said axle toward a neutral position away from rubbing contact with said yoke.

4. A gauge as recited in claim 1, in which the other of said rest legs nearest said reference probe terminates in further roller means for engaging a reference surface, said further roller means being rotatable about an axis substantially parallel to the engaged reference surface.

5. A gauge for measuring a dimension of a workpiece at a predetermined drop distance from reference surfaces of said workpiece, comprising a beam, having a longitudinal dimension, a first drop leg affixed to said beam, a reference probe carried by said first drop leg, in spaced relation to said beam, a second drop leg mounted for movements longitudinally of said beam, a sensitive probe carried by said second drop leg in spaced relation to said beam, two pairs of rest legs mounted to and extending from said beam, one pair being adjacent each of said drop legs, said pairs being mounted in longitudinally-spaced relation on said beam for abuttingly engaging said reference surfaces of the workpiece so that upon engagement of said rest legs with said reference surfaces said probes at predetermined drop distances from said reference surfaces, each of one pair of said rest legs located nearest said sensitive probe including first roller means for abuttingly engaging a reference surface, said first roller means comprising a wheel, an axle supported on a rest leg of said one pair, a ball bushing received on said axle in axially-slidable relation, and an anti-friction bearing supporting said wheel on said ball bushing for rotation about said axle to impart low-friction mobility to said one pair of rest legs along perpendicular axes mutually parallel to the engaged reference surface to thereby enable the sensitive end of said gauge to have limited omnidirectional movement in a plane parallel to said engaged reference surface, each of a second pair of said rest legs located nearest said reference probe including second roller means for engaging a reference surface, said second roller means being rotatable about an axis substantially parallel to the engaged reference surface.

6. A gauge as recited in claim 5, in which each of said axles extends substantially parallel to the longitudinal dimension of said beam.

7. A gauge as recited in claim 5, in which each of said second roller means is rotatable about a single axis.

References Cited

UNITED STATES PATENTS

| | | | |
|---|---|---|---|
| 3,264,041 | 8/1966 | Lill | 308—6 |
| 2,501,130 | 3/1950 | Kuppersmith | 33—147 |
| 1,845,199 | 2/1932 | Schnuck | 33—147 |

FOREIGN PATENTS

| | | |
|---|---|---|
| 617,221 | 2/1949 | Great Britain. |
| 600,960 | 4/1948 | Great Brtain. |

ROBERT B. HULL, Primary Examiner

R. A. FIELDS, Assistant Examiner